March 6, 1962  H. F. HICKS, JR  3,023,662
HEMISPHERICAL SCANNING SYSTEM
Filed Aug. 22, 1958
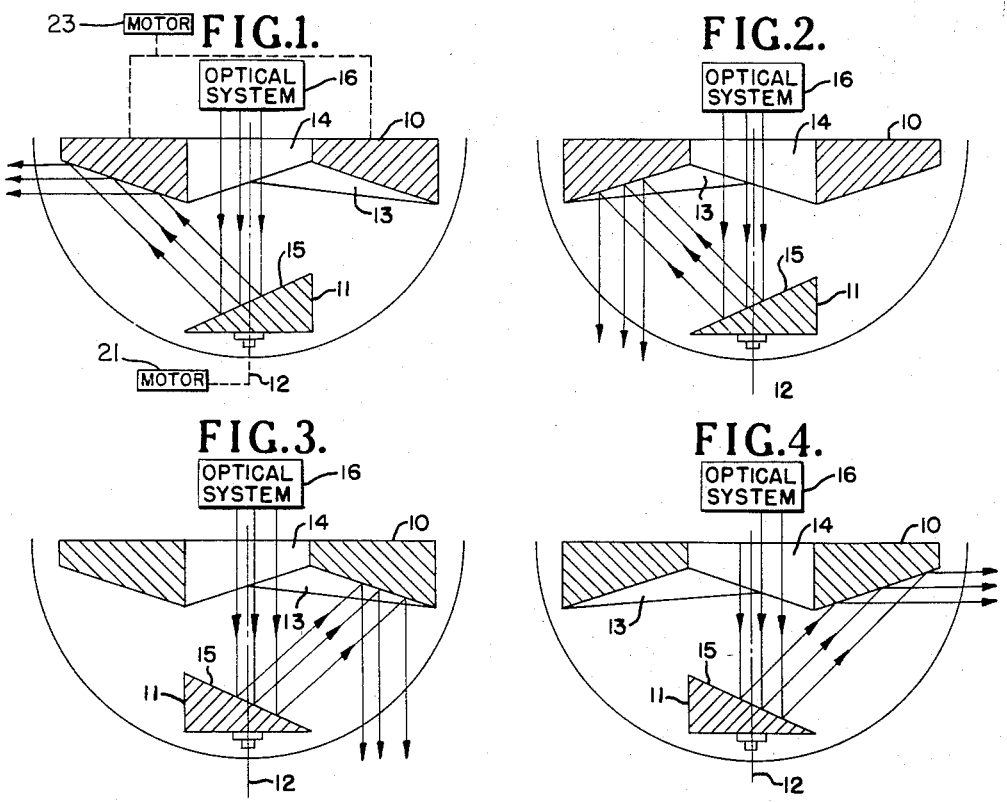
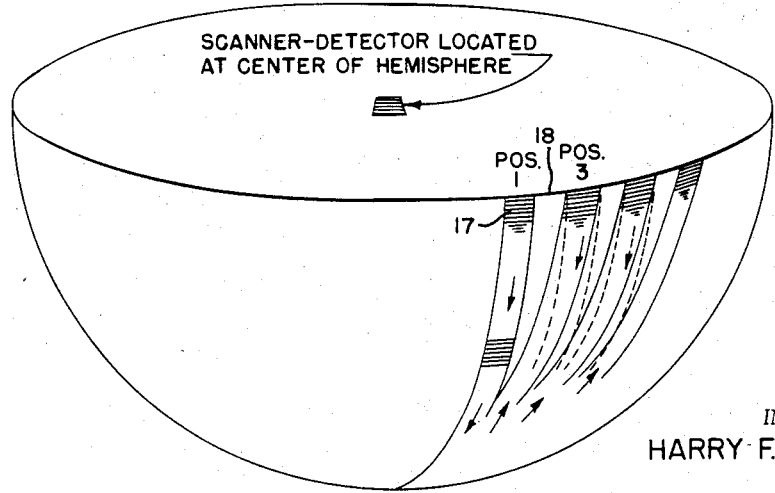
INVENTOR.
HARRY F. HICKS Jr.
ATTORNEYS.

3,023,662
HEMISPHERICAL SCANNING SYSTEM
Harry F. Hicks, Jr., Rochester, N.Y., assignor, by mesne assignments, to the United States of America as represented by the Secretary of the Navy
Filed Aug. 22, 1958, Ser. No. 756,742
5 Claims. (Cl. 88—1)

This invention pertains to a scanning system and more particularly to a device for scanning a region of space throughout a hemispherical portion thereof.

One of the principal disadvantages of the scanning systems heretofore devised resides in the limited region which the device is adapted to scan.

One of the objects of the present invention, therefore, is to provide a new and improved device for scanning a region which is substantially hemispherical in configuration.

Another of the objects is the provision of a device for scanning a region of space which is essentially hemispherical in configuration in which a new and improved optical system having at least one movable element is employed.

Other objects and improvements will be apparent from the following description taken in connection with the accompanying drawings of which:

FIG. 1 is a diagrammatic view of the essential optical components of the system in one position thereof;

FIG. 2 is a view similar to FIG. 1 with one of the scanning elements moved to a position 180° from the position shown on FIG. 1;

FIGS. 3 and 4 are diagrammatic views similar to FIGS. 1 and 2 respectively with the other of the optical devices moved to a position 180° from the position of the other optical device shown on FIGS. 1 and 2; and FIG. 5 is a diagrammatic view on which is shown a scanning pattern of a hemispherical field with interlace.

Referring now to the drawing on which like numerals of reference are employed to designate like or similar parts throughout the several views for a more complete understanding of the invention and more particularly to FIG. 1 thereof, there is shown thereon an optical system of the present invention according to a preferred embodiment thereof and comprising an annular mirror 10 and a plane mirror 11 rotatable about a common axis 12. The mirrors 11 and 10 may be rotated by the motors 21 and 23, respectively, through any suitable driving connections (shown diagrammatically in FIG. 1). It is to be understood, however, that the mirrors may be rotated by any other suitable means or by hand, if desired. The annular mirror 10 is provided with a curved reflecting surface 13 on one side thereof and circling a circular aperture 14 concentric with the axis of rotation. The curved reflecting surface 13 is generated by a straight line lying in a plane passing through the axis and a radius of the annular mirror 10. The generating line is first at any chosen acute angle with respect to the radius in the plane with the angle apex central of the annulus. As the plane is rotated about the annulus axis, the angle of the generating line uniformly changes to an acute angle with the apex external of the annulus when the plane has turned 180°. The generating line will then return uniformly to its original position as the plane moves through the next 180°.

The plane mirror 11 is provided with a reflecting surface 15 inclined at an angle with respect to the axis 12 about which the plane mirror rotates and so positioned that when the mirrors 10 and 11 are in the position shown on FIG. 1, rays from the optical system 16 impinge on the surface 15 of the plane mirror 11 and are reflected by the reflecting surface 13 of mirror 10 outwardly in a direction to the left, as viewed on the figure, and at a right angle with respect to the axis of rotation 12.

As shown on FIG. 2 of the drawing in which the annular mirror 10 is rotated 180° from the position shown on FIG. 1, the rays entering the field are reflected by the surface 13 of mirror 10 in such manner that they are directed in a direction parallel to the axis of rotation 12. Let it now be assumed that the axis of rotation is vertical, the rays reflected from surface 13 of mirror 10 are directed horizontally to the left when the mirror is in the position of FIG. 1 and vertically downward when the mirror 10 is in the position of FIG. 2.

With the mirror 10 in the position of FIG. 1 and the plane mirror 11 rotated 180° as shown on FIG. 3 the rays reflected from surface 13 of mirror 10 are directed in a direction parallel to the common axis of rotation of the mirrors and if this axis be assured to be vertical the rays are directed vertically downward.

When the mirror 10 has been rotated 180° from the position shown on FIG. 3 to the position of FIG. 4 and the plane mirror 11 is in the position shown on FIGS. 3 and 4, the rays reflecting from the surface 13 of mirror 10 are directed horizontally to the right in the direction normal to the axis of rotation of the mirrors.

It will, therefore, be understood that rotation of the annular mirror 10 through an angle of 180° effects a change in the direction of the rays reflected from the surface 13 thereof of 90°. In a similar manner rotation of mirror 10 through 180° from the position shown on FIG. 3 to the position shown on FIG. 4, with the plane mirror 11 reversed 180° from the position shown on FIGS. 1 and 2, effects a 90° change in the angle of the rays reflected from surface 13 of mirror 10 from a vertical position to a horizontal position in response to 180° of rotation of the annular mirror 10. It will be understood, therefore, that intermediate positions of the annular mirror would cause the rays to take intermediate positions in the field of the image of the detector. Scanning of the remaining portion of the hemispherical region is achieved by rotation of the plane mirror about the common axis 12. It should also be observed that rotation of the plane mirror about the axis 12 through an angle of 180° causes a change in direction of the rays entering the field of 180°. This is also illustrated in FIGS. 3 and 4 in which rotation of the plane mirror to a position 180° from the position shown on FIGS. 1 and 2 has caused the direction of the rays entering the field from the optical system to be changed through an angle of 180°.

FIG. 5 illustrates the manner in which the disclosed, novel, optical system is used in conjunction with conventional light scanning and detecting apparatus located at the center of the hemisphere being scanned. It is understood that any suitable image may appear on the interior surface of the hemisphere. The detector may be in the form of a conventional photocell, moving strip of film or any other suitable means.

In the operation of the device herein disclosed it is contemplated that the mirror 10 will rotate at a different rate of speed than the mirror 11. For example, if the speed of rotation of the annular mirror 10 exceeds the speed of rotation of the plane mirror 11 the detector would form a scanning pattern such as the pattern shown on FIG. 5. The rates at which mirrors 10 and 11 rotate can be controlled by using motors having different speeds or by utilizing different gearing arrangements between motors 23 and 21 and mirrors 10 and 11, respectively. The relative speeds of the two mirrors 10 and 11 will determine the advance made by the image of the detector during 360° rotation of the annular mirror. In FIG. 5, for example, during one rotation of the annular mirror 10, the detector image 17 has progressed from position 1 to position 2 and thence to position 3 as shown on FIG. 5. Position 3 may be conveniently spaced from position 1, if desired, such that a gap 18 is formed therebetween. This gap would be filled by the image of the detector on a successive rotation of the plane mirror whereby the scanning pattern includes an interlace feature, as well known in other types of scanning systems.

The size of the field scanned by this device is controlled by the angle of the reflecting surface 13 of the annular mirror 10 in such manner that an increase in the angle of the reflection surface 13 causes an increase in the size of the field scanned by the device.

Whereas the device of the present invention has been described with particularity with reference to a complete annular mirror, it will be noted that such a complete annular mirror would not be required if the reflecting surface thereof was caused to be moved by a motor drive in accordance with a predetermined scan pattern. Furthermore, if the device were provided with a pair of properly positioned prisms, the plane mirror and the annular mirror illustrated would not be required to reflect the rays.

In the event that the mirrors 10 and 11 illustrated were rotated at nearly equal speeds, the detecting device would describe a spiral in space in which the rotational velocity of the detector is determined by the rotational velocity of the plane mirror and the speed of advance of the spiral is determined by the difference between the speeds of the two mirrors.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A device for scanning a hemispherical region of space comprising an annular mirror having an aperture therein to transmit light rays and a curved reflecting surface on one side of said annular mirror surrounding said aperture, said curved surface being generated by a straight line lying in a plane passing through the axis and a radius of said annular mirror, said straight line being first at any chosen acute angle with respect to the radius in said plane and then by the movement thereof in said plane uniformly changing said angle upon rotation of said plane about the axis of said annular mirror, means for rotating said annular mirror about the axis thereof, a second rotatable mirror having a plane reflecting surface facing the reflecting surface of said annular mirror, and means for rotating said second mirror relative to said annular mirror and the region being scanned about an axis coincident with the first named axis, said reflecting surface of said plane mirror being inclined with respect to said axes in such manner that the rays entering said aperture are reflected by said plane mirror into impingement with a portion of said curved surface and thence outwardly into said region of space, the direction of said rays entering said region being controlled by the instantaneous positions of said annular and plane mirrors.

2. A device according to claim 1 including an optical system for initiating said rays and directing the rays through the aperture within said annular mirror into impingement with the reflecting surface of the plane mirror.

3. A device for scanning a region of space of hemispherical configuration comprising a rotatable annular mirror having an aperture therein and a curved reflecting surface on one side of said annular mirror, said curved surface being generated by a straight line lying in a plane passing through the axis and a radius of said annular mirror, said straight line being first at any chosen acute angle with respect to the radius in said plane and then by the movement thereof in said plane uniformly changing said angle upon rotation of said plane about the axis of said annular mirror, an optical system for directing rays through said aperture in a direction parallel to the axis of rotation of said annular mirror, a rotatable plane mirror having an inclined plane reflecting surface, means for rotating said plane mirror about the axis of said annular mirror, said inclined surface arranged in such manner as to reflect said rays into engagement with said curved surface at different positions thereof during successive rotations of said plane and annular mirrors thereby to cause said rays to be reflected by the annular mirror in a direction to scan said hemispherical region of space as said mirrors are rotated.

4. A scanning device according to claim 3 further including means to rotate said mirrors at different rates of rotation about said axis.

5. A scanning device according to claim 4 in which the relative rates of rotation of the annular and plane mirrors effect an interlace scanning pattern.

References Cited in the file of this patent

UNITED STATES PATENTS

| 2,758,502 | Scott et al. | Aug. 14, 1956 |
| 2,859,652 | Hopgood | Nov. 11, 1958 |

FOREIGN PATENTS

| 1,149,437 | France | Dec. 26, 1957 |